Feb. 23, 1943.    S. B. THOMAS    2,311,712
PROCESS FOR THE PREPARATION OF CATALYSTS
Filed April 15, 1940
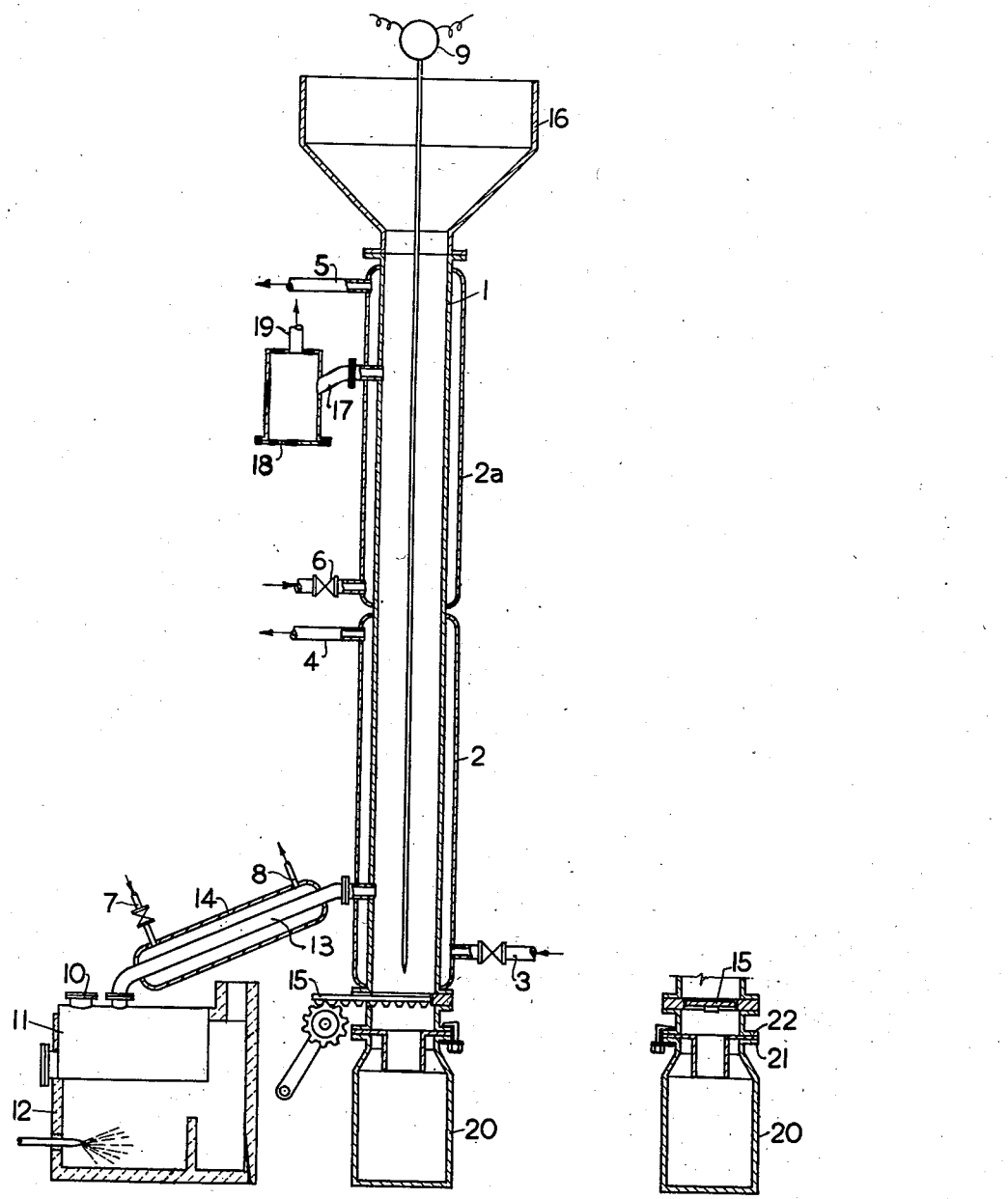
Fig. I            Fig. II
Inventor: Samuel Benson Thomas
By his Attorney:

Patented Feb. 23, 1943

2,311,712

UNITED STATES PATENT OFFICE 2,311,712

PROCESS FOR THE PREPARATION OF CATALYSTS

Samuel Benson Thomas, Berkeley, Calif., assignor to Shell Development Company, San Francisco, Calif., a corporation of Delaware Application April 15, 1940, Serial No. 329,698

6 Claims. (Cl. 252—251)

The present invention relates to a process for the preparation of catalysts by the impregnation of suitable adsorptive catalyst carriers with vapors of catalytic promoters.

An object of the invention is to provide a process whereby suitable adsorptive catalyst carrier materials may be impregnated with vapors of catalytic promoters in a most simple and economical manner. More particular objects are to provide a process for the impregnation of suitable adsorptive catalyst carriers with vapors of catalytic promoters wherein, (1) the adsorption may be executed under closely controlled conditions of temperature, pressure and time to produce catalysts containing a uniform and optimum concentration of promoter; (2) the catalyst preparation may be executed substantially continuously; (3) the impregnating vapors of catalytic promoter may be most efficiently utilized with a minimum of waste; and (4) the catalyst may be prepared and collected with a minimum contact with the atmosphere. A particular and preferred application of the process is for the impregnation of adsorptive catalyst carriers with anhydrous aluminum chloride to prepare promoted catalysts especially suitable for catalyzing vapor phase hydrocarbon reactions such as the isomerization of butane.

It is the usual practice in preparing supported catalysts to impregnate the desired carrier material with a solution of the promoter. In many cases the promoter is subsequently transformed into a more desirable catalytically active form by oxidation, reduction, precipitation, sulfidation, or the like. While this procedure is perfectly satisfactory for the preparation of many catalysts, it is entirely unsatisfactory for the preparation of others. Anhydrous aluminum chloride, for example, cannot conveniently be deposited upon carrier materials according to the above more general method. This material is a solid having an appreciable vapor pressure (it sublimes at 183° C.). It has a relatively small solubility in most non-aqueous solvents and reacts violently with water. It is an excellent catalyst for a wide variety of reactions and finds considerable use in the alkylation of hydrocarbons with olefins, the cracking of hydrocarbons, the polymerization of unsaturated hydrocarbons, the isomerization of hydrocarbons, and the like. In the execution of most of these reactions, particularly in liquid phase reactions, it is the common practice to use the anhydrous aluminum chloride per se without a support. The use of a supported catalyst may, however, be advantageous. When applied to a solid support the aluminum chloride loses much of its tendency to agglomerate to sticky, hard masses; the available active surface is increased; and the material is more easily handled and much better adapted for use in vapor phase reactions. It has, furthermore, recently been found that the activity and selectivity of aluminum chloride as a catalyst may be materially enhanced by combining it with certain active carrier or supporting materials. The promoting action of these carrier materials on the catalytic activity of aluminum chloride has been found to be dependent upon the amount and character of the carrier material and the method of impregnation.

One method for impregnating suitable carrier materials with aluminum chloride to produce these superior catalysts is to heat a mixture of a suitable carrier material and excess anhydrous aluminum chloride under pressure. Just prior to the solidification of the molten aluminum chloride upon cooling, the pressure is reduced causing the mixture to foam and solidify to a porous cake, which may be broken up and graded. This method requires high pressure corrosion resistant equipment and is quite costly.

It was later found that the promoting action may be further enhanced if thinner films of fused aluminum chloride are deposited upon the surface of the carrier. Methods and apparatus for preparing these superior catalysts by impregnating the carrier material with molten aluminum chloride and carefully draining off excess aluminum chloride under pressure are described and claimed in copending application, Serial No. 296,898, filed September 28, 1939.

It has since been found that the optimum promoting action of the carrier material is obtained when still thinner films of aluminum chloride are deposited on the surface and that the optimum activity and selectivity may be realized by impregnation of suitable adsorption carriers with aluminum chloride vapors. The optimum amount of aluminum chloride to be applied to any particular carrier material depends upon the character of the carrier material and may vary considerably. In most instances it is between about 8 and 28% by weight. These new and superior catalysts are described in copending application, Serial No. 330,756, filed April 20, 1940.

The present invention provides a means for producing these and similar superior catalysts in a most practical and economical manner. According to the present invention, the vapor phase impregnation is effected and superior catalysts are produced under controlled conditions in a continuous or semi-continuous countercurrent process. For this purpose, apparatus such as described below and illustrated in the attached drawing may be most advantageously applied.

Referring to the attached drawing, Figure I represents a sectional view in elevation of a preferred modification of the apparatus, and Figure II represents a sectional profile view of the discharge gate and removable receptacle shown in Figure I. Numeral 1 designates an adsorption chamber which is preferably elongated and vertically disposed as shown; other shapes and dispositions may, however, be employed.

The adsorption chamber is provided with a suitable means for heating and controlling the temperature therein. In the apparatus illustrated in Figure I, such a means is shown as a surrounding jacket through which a fluid heat carrier such as hot oil, Dowtherm, N. S. molten salts, hot gas, steam, or the like, may be circulated. I have found that the best control may be realized and superior catalysts prepared if the heating means is divided into a plurality of separately controllable elements. Thus, the jacket in Figure I is shown divided into two parts, 2 and 2a. Hot oil or any other suitable heating fluid is fed to the sections of the heating jacket via valved inlets 3 and 6. The fluid leaves the jacket 2 and 2a via outlets 4 and 5. In practice this fluid is reheated to a desired temperature in a suitable furnace (not shown) and recycled. By regulation of the temperature of the heating fluid and the rates of flow through the sections of the heating jacket, the temperature in the upper and lower portions of the adsorption chamber may be separately regulated and a desirable temperature gradient may be maintained. In order to aid in establishing and maintaining the optimum temperature conditions within the adsorption chamber, the apparatus is preferably provided with a temperature measuring means such as a sliding or multiple-junction thermocouple 9. By means of this instrument the temperature at various points in the adsorption chamber may be quickly determined.

The apparatus also comprises a vaporizing chamber 11 provided with a suitable heating means 12. In a preferred embodiment of the apparatus the vaporizing chamber 11 communicates with the adsorption chamber 1 via a pipe 13 which enters the adsorption chamber at a point along its length near the lower end, as shown. In order to avoid condensation of the catalyst promoter during transport from the vaporizing chamber to the adsorption chamber, pipe 13 is preferably either well heat insulated or provided with a heating means; in Figure I the transfer pipe 13 is shown provided with a jacket 14 having a valved inlet 7 and outlet 8 through which a heating fluid may be circulated. This heater may also serve to further regulate the temperature of the incoming vapors.

The lower end of the adsorption chamber is provided with an adjustable and closeable gate mechanism 15.

In the operation of the apparatus, a suitable solid adsorptive catalyst carrier, which it is desired to promote, is charged to the upper end of the adsorption chamber 1 via a hopper 16. Under normal conditions of operation the adsorption chamber will usually be full or nearly full. Anhydrous aluminum chloride, or any other desired volatile catalyst promoter, is charged to the vaporizer 11 via an inlet 10; the temperature in the adsorption chamber is adjusted by the quantity and temperature of heating medium passing through the heating jackets; and the vaporizer is heated to produce a more or less steady quantity of promoter vapors. Condensation of the promoter vapors prior to contacting the adsorptive carrier material is prevented and any desirable final adjustment of the temperature of the incoming vapors is effected by means of the heater 14. The promoter vapors contact the adsorptive carrier and are adsorbed for the most part in the lower section of the adsorption chamber, i. e., in that part of the chamber heated by jacket 2. Any unadsorbed vapors pass up through the adsorption chamber and are vented via an outlet 17 into a small air cooled chamber 18. Nearly all of any promoter vapors which escape adsorption in the lower section of the adsorption chamber are adsorbed upon passing up through the fresh adsorptive carrier in the upper portion of said chamber and only very small amounts normally pass out of the adsorption chamber via pipe 17. Any small amounts of promoter vapors which escape adsorption are condensed and deposited in the small condenser 18. Unadsorbable gases pass through the condenser and leave the system via pipe 19.

The catalyst in the lower portion of the adsorption zone is withdrawn continuously or at short intervals by means of the gate mechanism 15 into a suitable container 20.

In this method, it is seen that the adsorptive carrier and promoter vapors travel countercurrently; a proper temperature gradient in the adsorption chamber may be maintained; very little, if any, promoter is lost or must be recovered outside of the system; and a catalyst of uniform quality may be prepared conveniently in large quantities.

The present process and apparatus are particularly adapted and advantageous for the impregnation of adsorptive carriers with aluminum chloride. The carrier materials employed in the preparation of these catalysts are fully described in the above-mentioned application, Serial No. 330,756, filed April 20, 1940. Particularly effective carrier materials are, for example, activated alumina, Terrana, Porocel and the like. These carrier materials are usually heated to about 200 to 300° C. prior to impregnation. They usually still contain, however, appreciable quantities of firmly-bound water. In the impregnation, which is executed at a temperature between about 190 to 300° C., a portion of this firmly-bound water, as well as small amounts of water adsorbed from the atmosphere, reacts with the aluminum chloride to form hydrogen chloride. In the present method of preparation this liberated hydrogen chloride passes up through the bed of heated adsorptive carrier and, in so doing, a considerable proportion of it is adsorbed by the hot carrier material prior to its being contacted with any appreciable concentration of aluminum chloride vapors. This pre-adsorption of hydrogen chloride is very beneficial. Although the exact reason for the benefit of the hydrogen chloride is not known, it appears that a certain amount of exchange between the firmly-bound water of the adsorptive carrier and the hydrogen chloride takes place. This strongly adsorbed hydrogen chloride is believed to act as a more or less permanent promoter for the aluminum chloride which is deposited upon the adsorptive carrier immediately after. Excess hydrogen chloride leaves the system via pipe 19. In general, the excess hydrogen chloride and any other non-adsorbable gases tend to leave the system via pipe 17 rather than via the hopper 16, due to the greater resistance to passage up through the carrier material. If, in any case, undesirable fumes tend to seep up through the hopper, this may be easily avoided by applying a slight vacuum on the exit pipe 19.

An important advantage of the present process and apparatus is that superior catalysts of much better uniformity may be prepared. In the present process the adsorptive carrier material is passed through the adsorption zone continuously or semi-continuously and each particle is contacted with the promoter vapors under the desired conditions for the desired period of time to effect adsorption of the optimum quantity of promoter. The time of impregnation may be easily regulated by the rate of withdrawal of the catalyst and/or to some extent by the amount of heat supplied to the vaporizer. In the batchwise preparation of catalysts by vapor phase impregnation, on the other hand, I have found that that portion of the carrier situated nearest the point of introduction of the promoter vapors becomes impregnated to a substantially higher degree than that portion more remotely removed. Thus, although batches of catalysts may be prepared by these methods which by analysis appear to contain the optimum concentration of promoter, the individual catalyst pieces have different compositions; a good portion of the catalyst particles has less than the desired quantity of the promoter and a good portion has considerably more than the desired quantity. These catalysts consequently are not, in fact, promoted by the optimum quantity of promoter and are considerably less active than those having the same average chemical composition, but prepared according to the present method.

Still another advantage of the present process and apparatus is that the catalyst may be prepared and stored with a minimum contact with the air. In the case of supported aluminum chloride catalysts this is quite important since, if contact with the atmosphere is prolonged to any extent, the aluminum chloride supported on the catalyst surface reacts with the moisture in the air to form inactive alumina and hydrogen chloride. While in many cases a reasonable contact with the atmosphere is unavoidable and does not completely destroy the catalytic activity of the catalyst, it, nevertheless, may have an appreciable effect. This is particularly so in the catalysts prepared by vapor phase impregnation since their surface is in general more readily available and the quantity of aluminum chloride supported thereon is, in general, much smaller than in the case of catalysts of the older types. When preparing aluminum chloride impregnated catalysts according to the present invention, the catalyst is preferably withdrawn from its adsorptive chamber directly into a receiver 20 which is adapted to fit more or less air-tight to the bottom of the adsorption chamber. In Figures I and II the container 20 is shown with a flanged top 21 adapted to rest against a similar flange 22 near the end of the adsorption chamber. As soon as container 20 is filled, the gate 15 is closed, container 20 is removed and sealed and a new container is pressed up against the flange 22 under the adsorption chamber. In this way easily handled quantities of the fresh catalyst may be prepared and safely stored and transported to the reactor wherein the catalyst is to be used.

The following example illustrates the preparation of a vapor phase impregnated activated alumina-aluminum chloride catalyst on a commercial scale according to the process of the present invention. The adsorption chamber was 8⅔ feet long and was heated by circulating hot oil throughout a surrounding jacket divided into three sections. The adsorptive solid applied was a 6–8 mesh activated alumina previously dried at 300° C. to remove all but about 8% of chemically-bound water. The upper and lower sections of the adsorption chamber were maintained at temperatures of about 275° C. and 220° C. respectively. The activated alumina was passed downward through the adsorption zone at a rate of about 480 grams per hour while the aluminum chloride was vaporized at such a rate that little or no aluminum chloride vapors escaped from the outlet above the adsorption zone (pipe 17 in Figure I. The catalyst withdrawn into substantially air-tight containers contained 16.25% aluminum chloride (by titration), was uniform, and upon use in hydrocarbon conversions was found to be exceptionally active, selective and durable.

By employing somewhat lower temperatures in the upper and lower sections of the adsorption zone (240 and 200° C. respectively) catalysts of almost identical properties (17.8% aluminum chloride) were prepared at a considerably faster rate (620 grams per hour).

While I have described my process and apparatus in their preferred embodiments, I am aware that numerous variations and modifications will be readily apparent to those skilled in the art. I do not, therefore, desire my invention to be limited by the specific embodiments illustrated. On the other hand, it is my intention that all such modifications and variations as fall within the spirit of the invention are to be comprehended in the scope of the claims.

I claim as my invention:

1. A process for the production of improved combination aluminum chloride catalysts which comprises passing an adsorptive catalyst carrier in the form of fragments or granules in a bed down through a vertically disposed adsorption column maintained at a temperature between 190° C. and 300° C., vaporizing anhydrous aluminum chloride in a separate vaporizing zone, leading the vapors of aluminum chloride from said vaporizing zone into the lower part of said adsorption zone above the bottom thereof and up through said adsorption zone countercurrent to said bed of adsorptive catalyst carrier, and withdrawing aluminum chloride impregnated catalyst from said adsorption zone at a point below the point of introduction of said aluminum chloride vapors into said adsorption zone.

2. A process for the production of improved combination aluminum chloride catalyst which comprises passing an adsorptive catalyst carrier in the form of fragments or granules in a bed down through a vertically disposed adsorption column maintained at a temperature between 190° C. and 300° C., vaporizing anhydrous aluminum chloride in a separate vaporizing zone, leading the vapors of aluminum chloride from said vaporizing zone into the lower part of said adsorption zone above the bottom thereof and up through said adsorption zone countercurrent to said bed of adsorptive catalyst carrier, withdrawing aluminum chloride impregnated catalyst from said adsorption zone at a point below the point of introduction of said aluminum chloride vapors into said adsorption zone, and withdrawing hydrogen chloride vapors generated in said adsorption zone from said adsorption zone at a point below the point of introduction of said adsorptive catalyst carrier.

3. A process for the production of improved combination aluminum chloride catalysts which comprises passing an adsorptive catalyst carrier in the form of fragments or granules in a bed down through a vertically disposed adsorption column maintained at a temperature between 190° C. and 300° C., vaporizing anhydrous aluminum chloride in a separate vaporizing zone, leading the vapors of aluminum chloride from said vaporizing zone into the lower part of said adsorption zone above the bottom thereof and up through said adsorption zone countercurrent to said bed of adsorptive catalyst carrier, and withdrawing aluminum chloride impregnated catalyst from said adsorption zone at a point below the point of introduction of said aluminum chloride vapors into said adsorption zone while avoiding substantial contact with air.

4. A process for the production of improved combination aluminum chloride catalysts which comprises passing an adsorptive partially hydrated alumina in the form of fragments or granules in a bed down through a vertically disposed adsorption column maintained at a temperature between 190° C. and 300° C., vaporizing anhydrous aluminum chloride in a separate vaporizing zone, leading the vapors of aluminum chloride from said vaporizing zone into the lower part of said adsorption zone above the bottom thereof and up through said adsorption zone countercurrent to said bed of adsorptive catalyst carrier, and withdrawing aluminum chloride impregnated catalyst from said adsorption zone at a point below the point of introduction of said aluminum chloride vapors into said adsorption zone.

5. A process for the production of improved combination aluminum chloride catalysts which comprises passing an adsorptive catalyst carrier containing firmly bound water in the form of fragments or granules in a bed down through a vertically disposed adsorption column maintained at a temperature between 190° C. and 300° C., vaporizing anhydrous aluminum chloride in a separate vaporizing zone, leading the vapors of aluminum chloride from said vaporizing zone into the lower part of said adsorption zone above the bottom thereof and up through said adsorption zone countercurrent to said bed of adsorptive catalyst carrier, and withdrawing aluminum chloride impregnated catalyst from said adsorption zone at a point below the point of introduction of said aluminum chloride vapors into said adsorption zone.

6. A process according to claim 1 in which the temperature of the adsorption zone is maintained between 190° C. and 300° C. and the temperature at the point of introduction of the adsorptive catalyst carrier is maintained above that of the point of introduction of aluminum chloride vapors, thus maintaining an increased temperature gradient with respect to the aluminum chloride vapors.

SAMUEL BENSON THOMAS.